United States Patent
Fanning et al.

(10) Patent No.: US 12,061,903 B2
(45) Date of Patent: Aug. 13, 2024

(54) SOFTWARE DEVELOPMENT QUALITY ASSESSMENT

(71) Applicant: Microsoft Technology Licensing, LLC, Redmond, WA (US)

(72) Inventors: Michael C. Fanning, Redmond, WA (US); Suvam Mukherjee, Allston, MA (US); Danielle Nicole Gonzalez, LeRoy, NY (US); Christopher Michael Henry Faucon, Redmond, WA (US); Pragya Prakash, Amherst, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 17/946,168

(22) Filed: Sep. 16, 2022

(65) Prior Publication Data
US 2024/0095027 A1    Mar. 21, 2024

(51) Int. Cl.
G06F 8/77    (2018.01)

(52) U.S. Cl.
CPC .................... G06F 8/77 (2013.01)

(58) Field of Classification Search
None
See application file for complete search history.

(56) References Cited

U.S. PATENT DOCUMENTS

| | | | |
|---|---|---|---|
| 11,914,993 B1* | 2/2024 | Garg | G06N 20/00 |
| 2004/0083464 A1 | 4/2004 | Cwalina et al. | |
| 2007/0006161 A1* | 1/2007 | Kuester | G06Q 10/06 |
| | | | 717/121 |
| 2007/0174817 A1 | 7/2007 | Fanning et al. | |
| 2007/0180429 A1 | 8/2007 | Gogh et al. | |
| 2007/0226690 A1 | 9/2007 | Sandys et al. | |
| 2007/0288899 A1 | 12/2007 | Fanning et al. | |
| 2007/0294673 A1 | 12/2007 | Guerrera et al. | |

(Continued)

FOREIGN PATENT DOCUMENTS

WO    2021087648 A1    5/2021

OTHER PUBLICATIONS

Gleirscher, M. et al., "Introduction of Static Quality Analysis in Small and Medium-Sized Software Enterprises: Experiences from Technology Transfer", Nov. 22, 2016, arXiv:16011.07560v1. (Year: 2016).*

(Continued)

Primary Examiner — Andrew M. Lyons
(74) Attorney, Agent, or Firm — Ogilvie Law Firm

(57) ABSTRACT

Static analysis of a code base is expanded beyond finding faults to also find code instances where a particular fault could have occurred but did not. A conformance count reflects code portions that satisfy a specified coding rule per static analysis, and a nonconformance count reflects code portions that do not satisfy the coding rule. Various metrics computed from the conformance count and nonconformance count drive software development quality assessments. For example, bugs or bug categories may be prioritized for developer attention, static analysis tools are evaluated based on the metrics, to reduce noise by eliminating low-value bug alerts. Particular areas of expertise of developers and developer groups are objectively identified. Source code editors are enhanced to provide specific recommendations in context. Other quality enhancements are also provided.

20 Claims, 3 Drawing Sheets

(56) References Cited

U.S. PATENT DOCUMENTS

| | | | |
|---|---|---|---|
| 2008/0178155 A1 | 7/2008 | Gogh et al. | |
| 2008/0209401 A1 | 8/2008 | Fanning et al. | |
| 2008/0320457 A1 | 12/2008 | King et al. | |
| 2009/0070734 A1* | 3/2009 | Dixon | G06F 11/3616 |
| | | | 717/122 |
| 2009/0144698 A1 | 6/2009 | Fanning et al. | |
| 2010/0083238 A1 | 4/2010 | Barnett et al. | |
| 2010/0088669 A1 | 4/2010 | Cwalina et al. | |
| 2010/0211865 A1 | 8/2010 | Fanning et al. | |
| 2010/0211893 A1 | 8/2010 | Fanning et al. | |
| 2011/0113405 A1 | 5/2011 | Guerrera et al. | |
| 2011/0252394 A1* | 10/2011 | Sharma | G06F 11/3616 |
| | | | 717/101 |
| 2012/0159420 A1* | 6/2012 | Yassin | G06F 11/3672 |
| | | | 717/101 |
| 2012/0246170 A1* | 9/2012 | Lantorno | G06F 11/3672 |
| | | | 707/E17.071 |
| 2012/0266141 A1 | 10/2012 | Fanning et al. | |
| 2012/0272220 A1 | 10/2012 | Calcagno | |
| 2012/0311533 A1 | 12/2012 | Fanning et al. | |
| 2012/0311535 A1 | 12/2012 | Fanning et al. | |
| 2012/0311536 A1 | 12/2012 | Fanning et al. | |
| 2012/0311540 A1 | 12/2012 | Fanning et al. | |
| 2012/0311546 A1 | 12/2012 | Fanning et al. | |
| 2012/0331374 A1 | 12/2012 | Fanning et al. | |
| 2012/0331375 A1 | 12/2012 | Fanning et al. | |
| 2013/0159967 A1 | 6/2013 | Jazdzewski et al. | |
| 2013/0159968 A1 | 6/2013 | Jazdzewski et al. | |
| 2013/0159976 A1 | 6/2013 | Jazdzewski et al. | |
| 2013/0159978 A1 | 6/2013 | Jazdzewski et al. | |
| 2013/0212595 A1 | 8/2013 | Fanning et al. | |
| 2013/0246417 A1 | 9/2013 | Seth et al. | |
| 2013/0249917 A1 | 9/2013 | Fanning et al. | |
| 2013/0263102 A1 | 10/2013 | Ergan et al. | |
| 2013/0311973 A1 | 11/2013 | Rice et al. | |
| 2013/0326490 A1 | 12/2013 | Anderson et al. | |
| 2014/0053142 A1 | 2/2014 | Fanning et al. | |
| 2014/0068544 A1 | 3/2014 | Fanning et al. | |
| 2014/0075451 A1 | 3/2014 | Anderson et al. | |
| 2014/0082595 A1 | 3/2014 | Van Gogh et al. | |
| 2014/0109106 A1 | 4/2014 | Fanning et al. | |
| 2014/0181592 A1 | 6/2014 | Andrew et al. | |
| 2014/0181792 A1 | 6/2014 | Fanning et al. | |
| 2014/0189662 A1 | 7/2014 | Mameri et al. | |
| 2014/0282427 A1 | 9/2014 | Fanning et al. | |
| 2014/0283096 A1 | 9/2014 | Neerumalla et al. | |
| 2014/0289697 A1* | 9/2014 | Wenda | G06Q 10/06 |
| | | | 717/102 |
| 2014/0358961 A1 | 12/2014 | Louvau et al. | |
| 2014/0372988 A1 | 12/2014 | Fanning et al. | |
| 2015/0095885 A1 | 4/2015 | Louvau et al. | |
| 2015/0154402 A1 | 6/2015 | Arbabi et al. | |
| 2015/0193214 A1 | 7/2015 | Fanning et al. | |
| 2015/0331727 A1 | 11/2015 | Mameri et al. | |
| 2015/0379084 A1 | 12/2015 | Louvau et al. | |
| 2016/0070765 A1 | 3/2016 | Louvau et al. | |
| 2016/0077828 A1 | 3/2016 | Ergan et al. | |
| 2016/0300066 A1 | 10/2016 | Arbabi et al. | |
| 2018/0173520 A1 | 6/2018 | Golding et al. | |
| 2019/0057012 A1 | 2/2019 | Fanning et al. | |
| 2019/0073365 A1* | 3/2019 | Jamshidi | G06F 16/9535 |
| 2020/0250070 A1* | 8/2020 | Willson | G06F 11/3692 |
| 2021/0349873 A1 | 11/2021 | Louvau et al. | |
| 2021/0357379 A1 | 11/2021 | Louvau et al. | |
| 2021/0406289 A1 | 12/2021 | Louvau et al. | |
| 2022/0012019 A1 | 1/2022 | Wilson-Thomas | |
| 2022/0326917 A1* | 10/2022 | Chintala | G06F 8/38 |

OTHER PUBLICATIONS

A. Mayr, R. Plösch, M. Kläs, C. Lampasona and M. Saft, "A Comprehensive Code-Based Quality Model for Embedded Systems: Systematic Development and Validation by Industrial Projects," 2012 IEEE 23rd International Symposium on Software Reliability Engineering, Dallas, TX, USA, 2012, pp. 281-290. (Year: 2012).*

International Search Report and Written Opinion received for PCT Application No. PCT/US2023/030752, Dec. 12, 2023, 15 pages.

Nikolic D, et al., "Analysis of the Tools for Static Code Analysis", 2021 20th International Symposium Infoteh-Jahorina (Infoteh), IEEE, Mar. 17, 2021, pp. 1-6, XP033902768.

"Function Point", Retrieved from: https://en.wikipedia.org/wiki/Function_point, Retrieved on Aug. 15, 2022, 5 Pages.

"What is Prevalence?", retrieved from <<https://www.nimh.nih.gov/health/statistics/what-is-prevalence#>>, no later than Aug. 4, 2022, 2 pages.

"Behavioural change theories", retrieved from <<https://en.wikipedia.org/wiki/Behavioural_change_theories>>, Jul. 11, 2022, 8 pages.

"Fogg Behavior Model", retrieved from <<https://behaviordesign.stanford.edu/resources/fogg-behavior-model>>, no later than Aug. 4, 2022, 2 pages.

"Static program analysis", retrieved from <<https://en.wikipedia.org/wiki/Static_program_analysis>>, Jul. 9, 2022, 6 pages.

"Static Analysis tools to detect architectural patterns", retrieved from << https://softwareengineering.stackexchange.com/questions/135224/static-analysis-tools-to-detect-architectural-patterns >>, Feb. 15, 2012, 3 pages.

Alexandra Altvater, "What Is Telemetry? How Telemetry Works, Benefits of Telemetry, Challenges, Tutorial, and More", retrieved from << https://stackify.com/telemetry-tutorial/ >>, Apr. 26, 2017, 12 Pages.

"Top 10 Best System Monitoring Software Tools [2022 Selective]", retrieved from << https://www.softwaretestinghelp.com/system-monitoring-software/ >>, Aug. 7, 2022, 35 pages.

"Fortify Static Code Analyzer", retrieved from << https://www.microfocus.com/en-us/cyberres/application-security/static-code-analyzer >>, no later than Aug. 16, 2022, 6 pages.

"SonarQube", retrieved from << https://en.wikipedia.org/wiki/SonarQube >>, May 9, 2022, 3 pages.

"JetBrains", retrieved from << https://en.wikipedia.org/wiki/JetBrains >>, Aug. 14, 2022, 8 pages.

"Eclipse (software)", retrieved from << https://en.wikipedia.org/wiki/Eclipse_(software) >>, Aug. 10, 2022, 13 pages.

"Bitbucket", retrieved from << https://en.wikipedia.org/wiki/Bitbucket >>, Jun. 15, 2022, 4 pages.

"GitHub Copilot", retrieved from << https://en.wikipedia.org/wiki/GitHub_Copilot >>, Jul. 28, 2022, 5 pages.

Miltos Allamanis, Marc Brockschmidt, "Finding and fixing bugs with deep learning", retrieved from << https://www.microsoft.com/en-us/research/blog/finding-and-fixing-bugs-with-deep-learning/ >>, Dec. 8, 2021, 5 pages.

"Data Mining Concepts", retrieved from << https://docs.microsoft.com/en-us/analysis-services/data-mining/data-mining-concepts?view=asallproducts-allversions >>, Jun. 13, 2022, 12 pages.

Nathaniel Ayewah, et al., "Evaluating Static Analysis Defect Warnings on Production Software", retrieved from << https://findbugs.cs.umd.edu/papers/FindBugsExperiences07.pdf >>, no later than Dec. 31, 2007, 7 pages.

"Metrics", retrieved from << https://dartcodemetrics.dev/docs/metrics >>, no later than Aug. 17, 2022, 2 pages.

Meine J.P. van der Meulen and Miguel A. Revilla, "Correlations between Internal Software Metrics and Software Dependability in a Large Population of Small C/C++ Programs", retrieved from << https://www.ecs.csun.edu/~rlingard/comp589/HoffmanArticle.pdf >>, no later than Dec. 31, 2007, 6 pages.

Nagappan, N., & Ball, T., "Use of relative code churn measures to predict system defect density", in Proceedings of the 27th international conference on Software engineering, pp. 284-292, no later than Dec. 31, 2005.

Annapurna, H., & Jagadish, S., "Making code structural quality metrics more relevant and useful in a project context", Proceedings of CONSEG-09: International Conference on Software Engineering, Dec. 17-19, 2009, Chennai, India, 7 pages.

(56) References Cited

OTHER PUBLICATIONS

Nagappan, N., & Ball, T., "Static analysis tools as early indicators of pre-release defect density", in Proceedings. 27th International Conference on Software Engineering, May 15-21, 2005. ICSE 2005., pp. 580-586.

Soderberg, E., Church, L., & Host, M., "Open data-driven usability improvements of static code analysis and its challenges", in Evaluation and Assessment in Software Engineering, pp. 272-277, Jun. 21-23, 2021.

Arusoaie, A., et al. "A comparison of open-source static analysis tools for vulnerability detection in c/c++ code", in 2017 19th International Symposium on Symbolic and Numeric Algorithms for Scientific Computing (SYNASC), pp. 161-168, no later than Dec. 31, 2017.

Li, H. F., & Cheung, W. K., "An empirical study of software metrics", IEEE Transactions on Software Engineering, pp. 697-708, no later than Dec. 31, 1987.

McLean, R. K., "Comparing static security analysis tools using open source software", in 2012 IEEE Sixth International Conference on Software Security and Reliability Companion, pp. 68-74, no later than Dec. 31, 2012.

Gill, G. K., & Kemerer, C. F., "Cyclomatic complexity density and software maintenance productivity", IEEE transactions on software engineering, 17 (12), 1284-1288, no later than Dec. 31, 1991.

Ayman Madi, "On the Improvement of Cyclomatic Complexity Metric", International Journal of Software Engineering and Its Applications, vol. 7, No. 2, no later than Mar. 31, 2013, 16 pages.

Delaitre, A., Stivalet, B., Fong, E., & Okun, V., "Evaluating bug finders-test and measurement of static code analyzers", in 2015 IEEE/ACM 1st International Workshop on Complex Faults and Failures in Large Software Systems (COUFLESS), pp. 14-20, no later than Dec. 31, 2015.

Singh, G., Singh, D., & Singh, V., "A study of software metrics", IJCEM International Journal of Computational Engineering & Management, 11 (2011), 22-27, no later than Jan. 31, 2011.

Devine, T. R., Goseva-Popstajanova, K., Krishnan, S., Lutz, R. R., & Li, J. J., "An empirical study of pre-release software faults in an industrial product line", in 2012 IEEE Fifth International Conference on Software Testing, Verification and Validation, pp. 181-190, no later than Dec. 31, 2012.

Blondeau, V., Anquetil, N., Ducasse, S., Cresson, S., & Croisy, P., "Software metrics to predict the health of a project? an assessment in a major it company", in Proceedings of the International Workshop on Smalltalk Technologies, pp. 1-8, Jul. 15-16, 2015.

Rahman, A., Pradhan, P., Partho, A., & Williams, L., Predicting android application security and privacy risk with static code metrics. In 2017 IEEE/ACM 4th International Conference on Mobile Software Engineering and Systems (MOBILESoft), pp. 149-153, no later than Dec. 31, 2017.

Rosenberg, L. H., & Hyatt, L. E., Software quality metrics for object-oriented environments. Crosstalk journal, 10 (4), 1-6, no later than Dec. 31, 1997.

Rosenberg, L., Hammer, T., & Shaw, J., "Software metrics and reliability", in 9th international symposium on software reliability engineering, no later than Dec. 31, 1998.

Pantiuchina, J., Lanza, M., & Bavota, G., "Improving code: The (mis) perception of quality metrics", in 2018 IEEE International Conference on Software Maintenance and Evolution (ICSME), pp. 80-91, no later than Dec. 31, 2018.

"PolyCheck", retrieved from << https://social.msdn.microsoft.com/forums/en-US/e444dc97-76a4-4612-9751-53bb5a30160b/polycheck?forum=aspvisualstudio >>, Oct. 30, 2008, 4 pages.

"Getting started with Credential Scanner (CredScan)", retrieved from << https://secdevtools.azurewebsites.net/helpcredscan.html >>, no later than Sep. 8, 2022, 7 pages.

\* cited by examiner

SOFTWARE DEVELOPMENT QUALITY ASSESSMENT

BACKGROUND

Noon Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices are developed by people who may be known as developers, programmers, engineers, or coders, for example, but are referred to collectively here as "developers". Developers may use source code editors, compilers, debuggers, profilers and various other software development tools as they develop software. Although many advances have been made, improvements in software development technologies are still possible.

SUMMARY

Some embodiments described herein address technical challenges related to tools and techniques for assessing technical quality during software development. Some of these challenges include how to prevent or at least identify low value static analysis tool results, how to efficiently and effectively identify and present previous solutions of programming problems as recommendations in a source code editor, how to objectively score individual developers or developer groups for their expertise with respect to particular programming challenges without burdening the developers with tests, and how to quantify software quality in a manner that depends not only on what bugs were fixed but also on what mistakes were avoided and thus did not need to be fixed. An associated challenge in each case is how to accomplish these results efficiently and effectively in complex software development environments which involve too much data changing too quickly to rely on ad hoc human review or on subjective mental impressions for useful quality assessment results.

To address these and other challenges, some embodiments obtain a conformance count which represents a count of conformant code instances in a source code, and also obtain a nonconformance count which represents a count of nonconformant code instances in the source code. These counts are each based on automated static analysis of the source code for conformance to a coding quality standard. One or more quality assessment metrics are computed, based on the conformance count and the nonconformance count. The metrics guide or support direct action by a software development quality assessment (SDQA) computing system. Direct action may include, e.g., ranking source codes based on a specified coding quality standard, ranking coding quality standards for relevance, ranking developers as to their expertise in meeting the coding quality standard, ranking static analysis results or static analyzer tools, and ranking code instances as to conformance with the coding quality standard.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
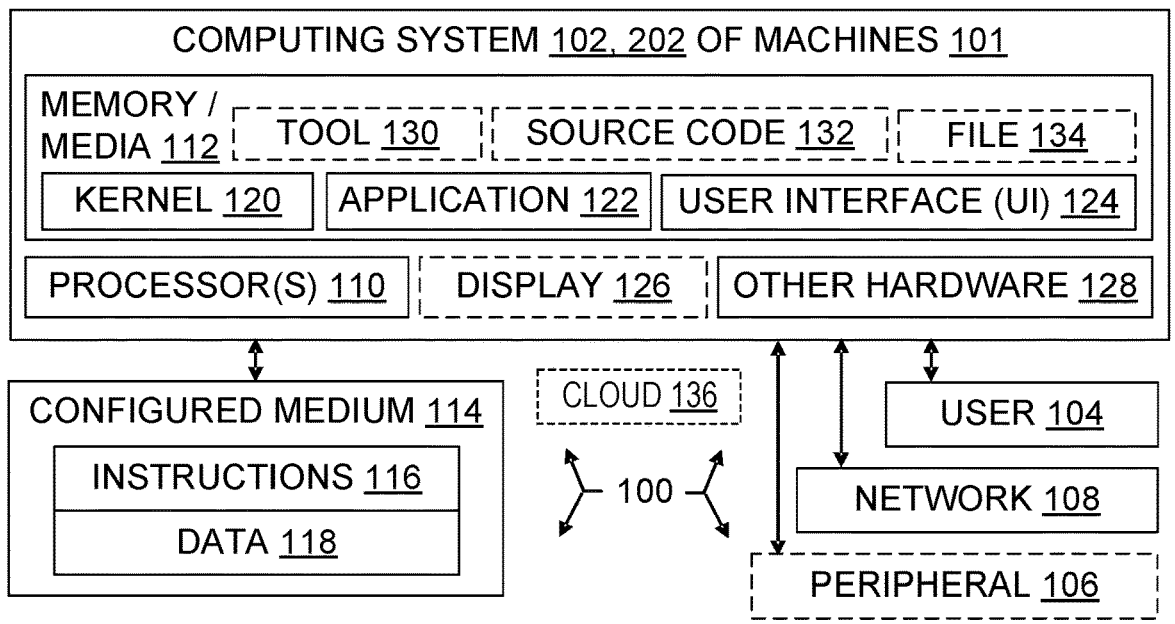
FIG. 1 is a diagram illustrating aspects of computer systems and also illustrating configured storage media.

Innovations may expand beyond their origins, but understanding an innovation's origins can help one more fully appreciate the innovation. In the present case, some teachings described herein were motivated by technical challenges arising from ongoing efforts by Microsoft innovators to help software developers. Microsoft innovators conceived and explored various ways to effectively employ new kinds of data tracking to assist software development, and they considered related questions such as how development tools can support source code editing and promote improved code quality.

The innovators recognized that the potential amount of data which could, in theory, be tracked, indexed, and subsequently retrieved during a software development project is enormous. One broad category of software development data is software developer activity. Every keystroke can change the content of a source code file, so individually tracking each typed input to an editor could produce tens of thousands of individual snapshots for even a relatively short file holding a few hundred lines of code. Indeed, simply scrolling through a file without changing any of the source code is also a part of a development project's history, at least in theory, because scrolling indicates which parts of the file received the developer's interest.

Many other developer activities also could, in theory, be stored as corresponding data, indexed, and later retrieved, subject to appropriate privacy and security limitations. Potentially relevant developer activities include conversations with other members of a development team, browsing online software development forums, consulting programming language manuals, reading other source code, and so on.

Compilation attempt results, build attempt results, test results, performance measures, and debugging sessions, are each also a part of the development history that could, in theory, be represented as data that is stored, indexed, and later retrieved.

Computer code may also be characterized by a wide range of other kinds of data. Some of the many possible examples include the number of bugs fixed, the number of lines of source code, the proportion of comments to non-commented source code, the frequency and size of source code changes made in a repository, the build time for creating an executable code, and executable code performance data such as the amount of memory used, network bandwidth used, transaction speed or other operation execution speed, time between crashes or other failures, and so on.

These lists of different kinds of software development data are merely examples to illustrate the vast amount and variety of data involved. They are not comprehensive or a summary of all software development data.

Accordingly, an initial technical challenge faced by the innovators was how to narrow the scope of software development data by specifying a portion that will be helpful to improving the quality of software development efforts, will be manageable in size, and can be made available for use without unduly burdening developers or hindering software development. The innovators focused their attention on quality assessment, and in particular on a collection of software development scenarios which involve assessing quality. Many of these scenarios involve ranking items, with a view toward making software development more efficient and effective by improving quality based on ranking results.

The innovators gained an insight into software development quality assessment, namely, that it would be beneficial to assess quality in a manner that depends not only on what mistakes were fixed but also on what mistakes were avoided and thus did not need to be fixed. To implement this insight, the inventors focused on mistakes whose presence or absence are detectable in program code using static analysis. Static analysis is an automated process which examines a code (usually but not always a source code) of a program without executing the program. It is sometimes called "static program analysis" or "static code analysis". A wide variety of static analysis tools are commercially available.

As a motivating example highlighting the innovators' insight, consider two files of source code, which for the sake of this example are presumed to have essentially the same length and essentially the same complexity. Suppose the quality of the source codes is being assessed with respect to a particular coding quality standard, namely, whether a division by zero may occur when code built from the source code is executed. In a source code file A, seven divide-by-zero bugs were fixed and in a source code file B, one divide-by-zero bug was fixed. If bug fixes are the main measure of quality (which is the case in many actual software projects), then file A would be graded as better than file B. However, it may be that fewer bugs were fixed in B because fewer mistakes were made in B. In that case, if avoidance of mistakes is the measure of quality then B is better than A.

Some embodiments described herein build on the innovators' insight by defining and computing various software development quality assessment (SDQA) metrics. Several metrics are taught, but they largely depend on two values produced by static analysis: a conformance count and a nonconformance count. These counts reflect the conformance or nonconformance, respectively, of a piece of code to a quality standard. The conformance count represents places in the code where the quality standard is met, and the nonconformance count represents places in the code where the quality standard could have been met but is not met. SDQA rankings are then based on computed metric values for different items, e.g., different pieces of code, different quality standards, different static analysis tools, or the pieces of code produced by different developers.

For example, ranking pieces of code based on SDQA metric scores has the benefit of measuring code quality based on problems avoided, not merely on the basis of problems fixed. This simplifies software development by providing a quality control mechanism for decisions such as whether to release code to production, and whether to update a given program's code or replace it. In particular, if there are no known bugs but an initial nonconformance count was high each time the code was statically analyzed with respect to an additional coding quality standard, then the code may well be an ongoing fountain of bugs even though no bugs are known at present.

As another example, associating developer identity with SDQA ranked or scored code has the benefit of measuring developer expertise based on problems avoided, not merely on the basis of problems fixed. For instance, developers who exhibit expertise in meeting a particular coding standard, or in meeting a particular set of coding standards, can be identified on the basis of the SDQA metric values. When another developer encounters a problem meeting that coding standard, a tool can proactively recommend the more expert developer as a source of information or assistance. This simplifies software development, helps reduce coding errors, and improves code reliability.

As yet another example, comparing SDQA ranked or scored coding standard scores with code changes helps identify static analysis results that are being ignored. Suppose a nonconformance count for a particular coding standard is high, and remains high over time despite changes to the analyzed code. Perhaps the analyzed code is a test code which has a low priority for being fixed. But if not, then the static analysis tool may be reporting things as problems that developers do not agree are actually problems. This kind of information simplifies software development by reducing noise in the bug reports or other issue reports that are generated by static analysis tools. Different static analysis tools can also be compared to see which tool is better at spotting a particular kind of coding issue.

An alternative to the use of teachings herein is to maintain a tight focus on bug fixes as the primary or sole measure of code quality, or of developer expertise, or of both. But this alternative lacks several useful capabilities of embodiments taught herein, such as objectively identifying developers that are good at avoiding particular bugs, objectively assessing the innate complexity of a coding issue, objectively identifying reporting problems with static analysis tools, or objectively calculating the likelihood that a given kind of coding problem will be fixed.

These advantages over the alternative approach, and other benefits of teachings provided herein, will become apparent to one of skill from the present disclosure.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. Applications 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, SDQA functionality 210 could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
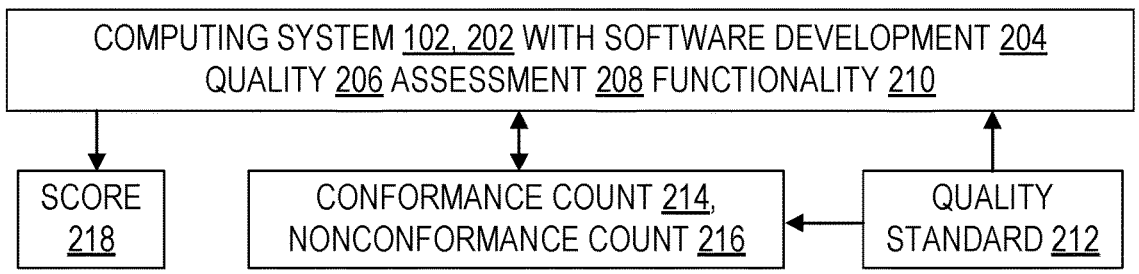
FIG. 2 is a diagram illustrating aspects of a computing system which has one or more of the software development quality assessment (SDQA) enhancements taught herein.

FIG. 2 illustrates a computing system 102 configured by one or more of the SDQA enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
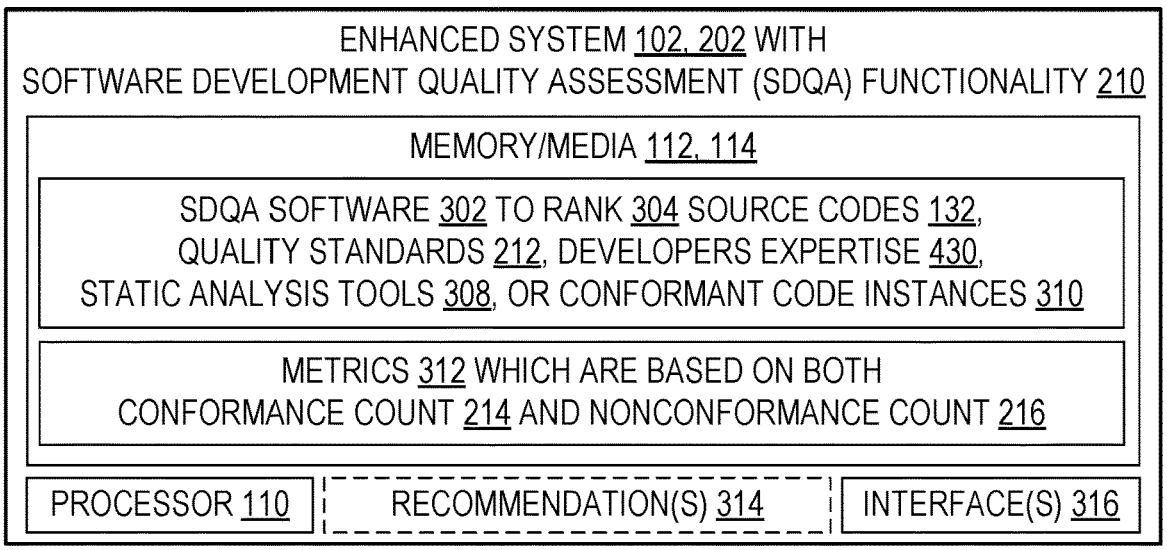
FIG. 3 is a block diagram illustrating an enhanced system configured with SDQA functionality.

FIG. 3 illustrates an enhanced system 202 which is configured with software development quality assessment (SDQA) software 302 to provide SDQA functionality 210. Software 302 and other FIG. 3 items are discussed at various points herein, and additional details regarding them are provided in the discussion of a List of Reference Numerals later in this disclosure document.

Figure 4:
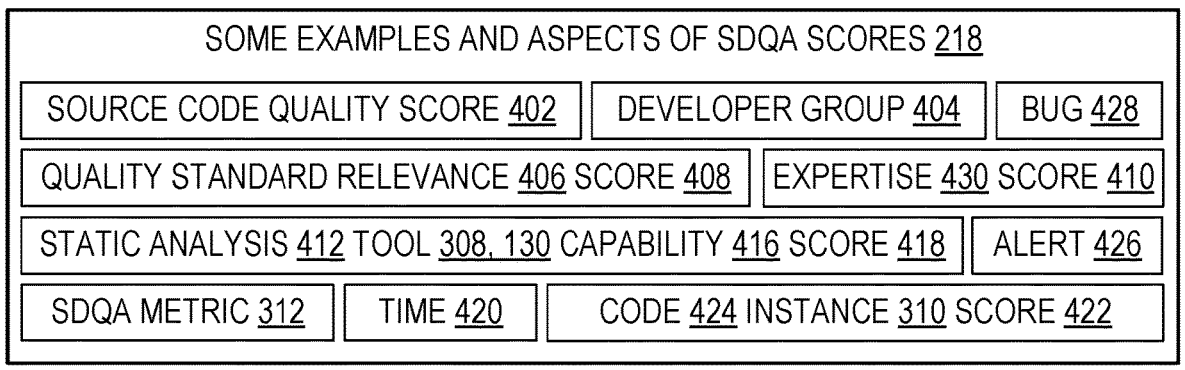
FIG. 4 is a block diagram illustrating some examples and aspects of SDQA scores.

FIG. 4 shows some examples and some aspects of SDQA scores 218. FIG. 4 items are discussed at various points herein, and additional details regarding them are provided in the discussion of a List of Reference Numerals later in this disclosure document.

Figure 5:
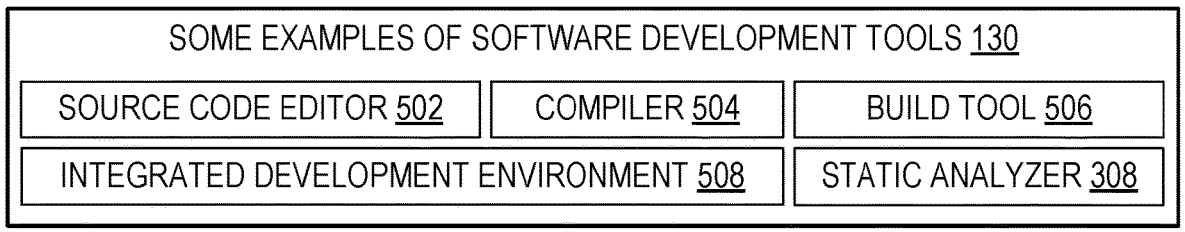
FIG. 5 is a block diagram illustrating some examples of software development tools.

FIG. 5 shows some examples of software development tools 130. FIG. 5 items are discussed at various points herein, and additional details regarding them are provided in the discussion of a List of Reference Numerals later in this disclosure document.

Figure 6:
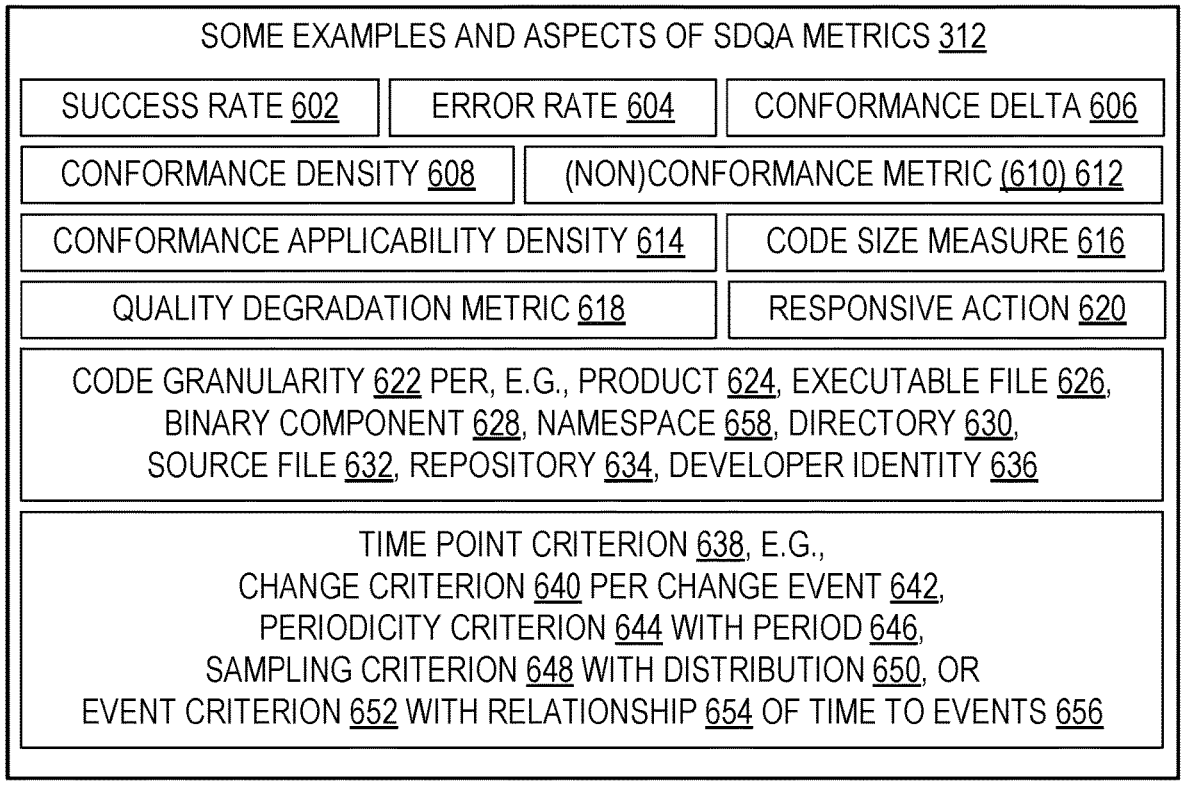
FIG. 6 is a block diagram illustrating some examples and aspects of SDQA metrics.

FIG. 6 shows some examples and some aspects of SDQA metrics 312. FIG. 6 items are discussed at various points herein, and additional details regarding them are provided in the discussion of a List of Reference Numerals later in this disclosure document.

FIGS. 4, 5, and 6 are not comprehensive, in the sense that other specific examples and other specific aspects pertinent to software development quality assessment may well also become apparent to one of skill who is informed by the teachings provided herein. In the context of FIGS. 4 to 6, an "example" is presumptively part of at least one embodiment, whereas an "aspect" is not presumptively part any embodiment, but is nonetheless identified by, accessed by, or otherwise functionally related to at least one embodiment. For instance, a code size measure 616 is not itself a SDQA metric 312, but may be part of a computation of a SDQA metric 312 in a given embodiment.

FIGS. 1 through 6 are not themselves a complete summary of all approaches to software development quality assessment. Nor are they a complete summary of all aspects of an environment 100 or system 202 or other computational context of source code 132 or other code 424, whether the code is under development or not. FIGS. 1 through 6 are also not by themselves a complete summary of all software development quality assessment software 302, enhanced systems 202, enhanced tools 130, other mechanisms, or other SDQA functionalities 210 suitable for potential use in a system 202.

In some embodiments, the enhanced system 202 may be networked through an interface 316. An interface 316 may include hardware such as network interface cards, software such as network stacks, APIs, or sockets, combination items such as network connections, or a combination thereof.

In some embodiments, an enhanced system 202 includes a software development quality assessment computing system 202 which is configured to perform software development quality assessment operations. The enhanced system 202 includes a digital memory 112 and a processor 110 in operable communication with the memory. In a given embodiment, the digital memory 112 may be volatile or nonvolatile or a mix. The enhanced system 202 also includes at least one processor 110 in operable communication with the digital memory 112. The at least one processor is configured to collectively perform software development quality assessment 208 operations 700.

In some embodiments, these operations 700 include automatically: obtaining 702 a conformance count 214 which represents a count of conformant code instances 310 in a first source code 132, the conformance count based on an automated static analysis 412 of the first source code for conformance to a first quality standard 212; obtaining 702 a nonconformance count 216 which represents a count of nonconformant code instances 310 in the first source code, the nonconformance count based on the automated static analysis 412 of the first source code for conformance to the first quality standard; and utilizing 708 both the conformance count and the nonconformance count to perform at least one of the following: (a) compute 746 a quality score 402 for the first source code, (b) quantify 748 a relevance 406 of the first quality standard with respect to the first source code, (c) calculate 750 a first expertise score 410 for a first developer 104 who is associated with the first source code, (d) evaluate 752 a static analysis tool 308 as to a capability 416, or (e) select 712 one of the conformant code instances 310 as a presentable recommendation 314 of a software development tool 130.

In some embodiments, the conformance count 214 and the nonconformance count 216 are based on static analysis by the same tool 308. In other embodiments, the counts are based on two or more tools 308 mixed or matched in various ways to perform the automated static analysis 412 on which the counts 214, 216 are based.

In some embodiments, the software development computing system 202 also includes one or more static analysis tools 308, and the conformance count or the nonconformance count or both are based on static analysis of the first source code performed using at least one of those static analysis tools.

In some embodiments, the software development computing system 202 also includes a software development tool 130. For example, the software development tool 130 may be or include at least one of: a source code editor 502, a compiler 504, an integrated development environment (IDE) 508, or a software build tool 506. In some embodiments, the processor 110 is configured to display 730 in a user interface 124 of the software development tool 130 a result 732 of utilizing 708 the conformance count and the nonconformance count. For example, an IDE 508 could tell 730 a current developer their expertise score 410, could suggest 730 another developer be consulted based on their expertise score, or could present 728, 730 a conformant code instance 310 as a recommendation 314.

In some embodiments, the software development computing system 202 also includes a software development tool 130, and the tool 130 includes a source code editor 502 having a user interface 124. The processor 110 is configured to select 712 one of the conformant code instances 310 and to present 728, 730 the selected conformant code instance in the user interface as a recommendation 314.

In some embodiments, a system 202 counts 214 the instances 310 (e.g., call sites, or statements) that meet a specified standard 212 (e.g., avoid null pointer dereference, use descriptive identifier names as indicated by length or dictionary presence), counts 216 the instances 310 that do not meet the standard 212, and then facilitates software development 204 based on those counts. For example, the system 202 may give the code a quality score 402, give the code's developer an expertise score 410, flag 714 the static analysis tool that provided the alerts underlying the counts 214, 216, or make 712 one of the good instances available as a recommendation 314 a tool 130 can suggest 728 to developers.

Other system embodiments are also described herein, either directly or derivable as system versions of described processes or configured media, duly informed by the extensive discussion herein of computing hardware.

Although specific SDQA architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. For example, a given embodiment may include additional or different data structure implementations of SDQA scores 218, SDQA metrics 312, or recommendations 314, as well as different technical features, aspects, security controls, mechanisms, decision criteria, expressions, hierarchies, operational sequences, environment or system characteristics, or other SDQA functionality teachings noted herein, and may otherwise depart from the particular illustrative examples provided.

Processes (a.k.a. Methods)

Figure 7:
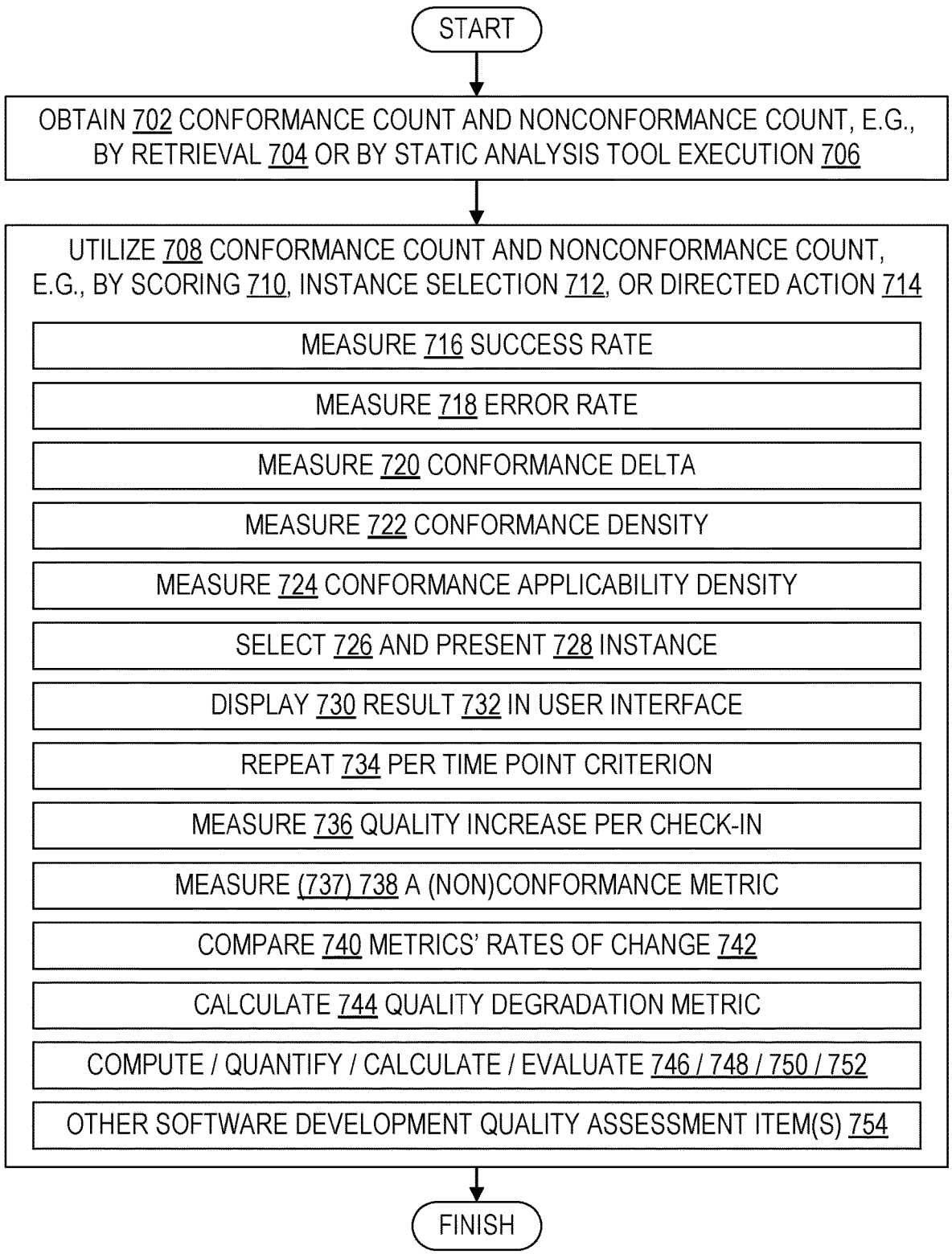
FIG. 7 is a flowchart illustrating steps in some methods for software development quality assessment.

Methods (which may also be referred to as "processes" in the legal sense of that word) are illustrated in various ways herein, both in text and in drawing figures. FIG. 7 illustrates a family of methods 700 that may be performed or assisted by an enhanced system, such as system 202 or another SDQA functionality enhanced system as taught herein. FIGS. 1 through 6 show SDQA architectures with implicit or explicit actions, e.g., steps for collecting data, transferring data, storing data, computing data, and otherwise processing data.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in a value for the system 202 to use as a developer identity 636. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. In particular, FIG. 7 steps depicted as boxes in a box, as with boxes 716, 718, . . . 754 inside box 708, may be performed in a different order than the top-to-bottom order shown. The box-in-a-box steps may also be performed serially, in a partially overlapping manner, or fully in parallel within a given flow, and may be omitted, combined, renamed, regrouped, or repeated, for example.

Arrows in method or data flow figures indicate allowable flows; any arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance of the process to another performance of the process. The flowchart traversal order may also vary from one process embodiment to another process embodiment. Steps may be omitted, combined, renamed, regrouped, be performed on one or more machines, or otherwise depart from the illustrated flow, provided that the process performed is operable and conforms to at least one claim.

Some embodiments provide or utilize a software development quality assessment method 700, the method being performed (executed) by a computing system 202, the method including: executing 706 an automated static analysis 412 of a first source code 132 for conformance to a first quality standard 212, thereby obtaining 702 a conformance count 214 which measures conformance to the first quality standard and obtaining 702 a nonconformance count 216 which measures nonconformance to the first quality standard; and utilizing 708 both the conformance count and the nonconformance count to compute 710 and assign 710 at least one of the following digital values 218: a quality score 402 for the first source code, a relevance score 408 of the first quality standard with respect to the first source code, a first expertise score 410 for a first developer 104 who is associated with the first source code, a first group expertise score 410 for a first group 404 of developers which is associated with the first source code, or a static analysis tool capability score 418.

In some embodiments, utilizing 708 the conformance count and the nonconformance count includes measuring 716, 718, or 720 at least one of the following: a success rate 602 which is defined as the conformance count divided by the sum of the conformance count and the nonconformance count, an error rate 604 which is defined as the nonconformance count divided by the sum of the conformance count and the nonconformance count, a conformance delta 606 which is defined as a difference between the nonconformance count and the conformance count, or a conformance delta which is defined as a difference between a nonconformance density and a conformance density.

In some embodiments, utilizing 708 the conformance count and the nonconformance count includes measuring 722 a conformance density 608 which is defined as the conformance count divided by a size measure of the first source code.

In some embodiments, utilizing 708 the conformance count and the nonconformance count includes measuring 724 a conformance applicability density 614 which is defined as a sum including the conformance count and the nonconformance count, the sum divided by a size measure 616 of the first source code. In some of these, the conformance applicability density 614 is measured based on at least one of the following granularities 622 of the first source code: a product 624 granularity, an executable binary file 626 granularity, a binary component 628 granularity, a directory 630 granularity, a source file 632 granularity, a repository 634 granularity, or a granularity based on at least one developer identity 636. In some embodiments, quality applicability density 614 represents a percentage usage of a code quality standard within all relevant commits, that is, those within the specified granularity or other boundaries.

In some embodiments, the method repeats 734 the counts 214 and 216 obtaining steps 702 and the counts utilizing step 708 at multiple points 420 in time, and the multiple points in time are chosen according to at least one of the following criteria 638: a change criterion 640 which specifies a source code change event 642; a periodicity criterion 644 which specifies a time period 646 between successive points 420 of the multiple points in time; a sampling criterion 648 which specifies a distribution 650 of the multiple points in time; or an event criterion 652 which specifies a relationship 654 of the multiple points in time to a set of events 656. Data from different points in time may be weighted differently. For example, more recent data may be weighted more heavily.

The following scenarios illustrate time point criteria 638 and metrics 312. Some embodiments compute a software quality score 402 for software 424 that is under development when the software is checked into a repository 634, in a software quality computed per event scenario. Some embodiments compute a software quality score 402 for software that is under development when the software is checked out from a repository 634, in another software quality computed per event scenario. Some embodiments compute a software quality score 402 for a random sampling of the source code 132 of a company that is being considered as a possible acquisition, in a software quality computed per sampling scenario. Some embodiments compute an expertise score 410 for a developer for software that is under development when the software is checked into a repository 634, in a developer expertise computed per event scenario. Some embodiments compute a capability score for a static analysis tool 308 every hundredth use of the tool 308, in a tool capability computed per event scenario. Other scenarios will also be apparent to one of skill who is informed by the teachings provided herein.

More generally, any SDQA metric 312 may be recalculated at different points in time based on one or more time point criteria 638. Metric 312 recalculation per then-current counts 214 and 216 may occur, e.g., under a change criterion 640 which specifies a source code change event 642 such as closing a modified file 632, checking a modified file 632 into a repository 634, or rebuilding a product 624 using a modified file 632. Metric 312 recalculation per then-current counts 214 and 216 may occur, e.g., under a periodicity criterion 644 which specifies a time period 646 such as daily, weekly, monthly, quarterly, or annually. Metric 312 recalculation per then-current counts 214 and 216 may occur, e.g., under a sampling criterion 648 which specifies a distribution 650 such as a random or pseudo-random sampling of files 134 in a specified directory 630, a specified repository 634, or per another granularity 622. Metric 312 recalculation per then-current counts 214 and 216 may occur, e.g., under an event criterion 652 which specifies a relationship 654 such as checking a file 134 into a repository 634 or rebuilding a product 624, regardless of any changes that may have been made to source code 132. Other examples will also be apparent to one of skill in the art informed by the teachings provided herein.

In some embodiments, the method repeats 734 the counts 214 and 216 obtaining steps 702 at multiple points 420 in time, and the counts utilizing step 708 includes: measuring 738 a conformance metric 612 which is based on at least the conformance count 214; measuring 738 a nonconformance metric 610 which is based on at least the nonconformance count 216; and at least one of: comparing 740 a conformance metric 612 rate 742 of change to a nonconformance metric 610 rate 742 of change, or calculating 744 a quality degradation metric 618.

In some embodiments, the method repeats 734 the counts 214 and 216 obtaining steps 702 while assessing conformance to a second quality standard 212, and the utilizing step 708 includes at least one of: ranking 304 the first quality standard and the second quality standard relative to one another based on at least the conformance count 214 for conformance to the first quality standard, the nonconformance count 216 for conformance to the first quality standard, the conformance count 214 for conformance to the second quality standard, and the nonconformance count 216 for conformance to the second quality standard; or ranking 304 the first quality standard and the second quality standard relative to one another based on at least the conformance count 214 for conformance to the first quality standard plus the nonconformance count 216 for conformance to the first quality standard, and the conformance count 214 for conformance to the second quality standard plus the nonconformance count 216 for conformance to the second quality standard. In some, the utilizing step 708 includes ranking 304 the first quality standard and the second quality standard relative to one another based on a conformance metric of the first quality standard, a nonconformance metric of the first quality standard, a conformance metric of the second quality standard, and a nonconformance metric of the second quality standard.

In some embodiments, the method repeats 734 the counts 214 and 216 obtaining steps 702 while assessing conformance of a second source code 132 to the first quality standard 212, and the utilizing step 708 includes ranking 304 the first source code and the second source code relative to one another based on at least the conformance count 214 of the first source code, the nonconformance count 216 of the first source code, the conformance count 214 of the second source code, and the nonconformance count 216 of the second source code. In some, the utilizing step 708 includes ranking 304 the first source code and the second source code relative to one another based on a conformance metric of the first source code, a nonconformance metric of the first source code, a conformance metric of the second source code, and a nonconformance metric of the second source code In some embodiments, the utilizing step 708 includes calculating 750 the first expertise score 410 for the first developer 104 or a first developer group 404 which includes the first developer, and the method further includes: calculating 750 a second expertise score 410 for a second developer 104 or a second developer group 404 which includes the second developer; and ranking 304 the first developer or the first developer group or both relative to the second developer or the second developer group or both based on at least the first expertise score and the second expertise score.

In some embodiments, the utilizing step 708 includes evaluating 752 the first static analysis tool 308 as to the capability 416, and the method further includes: evaluating 752 a second static analysis tool 308 as to the capability 416; and ranking 304 the first static analysis tool and the second static analysis tool relative to one another as to the capability.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as routines or other code implementing metrics 312 (referred to for convenience simply as metrics 312), static analysis tools 308, time point criteria 638, code granularity values or settings (referred to for convenience simply as code granularity 622), SDQA scores 218, developer identities 636, developer group data structures 404 (referred to for convenience simply as developer groups 404), and SDQA software 302, in the form of data 118 and instructions 116, read from a removable storage medium 114 and/or another source of data such as a network connection, to form a configured storage medium. The configured storage medium 112 is capable of causing a computer system 102 to perform technical process steps 700 for software development quality assessment, as disclosed herein. The Figures thus help illustrate configured storage media embodiments and process (a.k.a. method) embodiments, as well as system and process embodiments. In particular, any of the process steps illustrated in FIG. 7 or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a software development quality assessment method 700. This method 700 includes: obtaining 702 a conformance count which measures conformance to a first quality standard and obtaining 702 a nonconformance count which measures nonconformance to the first quality standard; and utilizing 708 both the conformance count and the nonconformance count to compute and assign (a.k.a. score 710) at least one of the following digital values 218: a quality score 402 for a first source code, a relevance score 408 of the first quality standard with respect to the first source code, a first expertise score 410 for a first developer who is associated with the first source code, a first group expertise score 410 for a first group of developers which is associated with the first source code, or a static analysis tool capability score 418.

In some embodiments, utilizing 708 the conformance count and the nonconformance count includes at least one of the following: measuring 716 a success rate which is defined as the conformance count divided by the sum of the conformance count and the nonconformance count; or measuring 718 an error rate which is defined as the nonconformance count divided by the sum of the conformance count and the nonconformance count.

In some embodiments, utilizing 708 the conformance count and the nonconformance count includes measuring 720 a conformance delta which is defined as a difference between the nonconformance count and the conformance count.

In some embodiments, utilizing 708 the conformance count and the nonconformance count includes computing 746 and displaying 730 at least one of the following rankings 304: a source code quality ranking of the first source code relative to a second source code, the source code quality ranking based at least on source code quality scores 402; or a relevance ranking of the first quality standard relative to a second quality standard, the relevance ranking based at least on relevance scores 408.

In some embodiments, utilizing 708 the conformance count and the nonconformance count includes computing 746 and displaying 730 an expertise ranking 304 of at least one developer relative to at least one other developer, the expertise ranking based at least on expertise scores 410.

Additional Observations

Additional support for the discussion of software development quality assessment functionality 210 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Sociotechnical Context Sensitive Static Analysis

Static analysis techniques have been the subject of intense research, including efforts to improve analysis engine 308 accuracy or to design efficient analysis engines 308 for domains such as distributed and mobile applications. Techniques which may improve the accuracy of static analyzers include making the analysis 412 context-sensitive, object-sensitive, path-sensitive, etc. A drawback of these techniques is that they assume that all bugs 428 are created equal, in that each true positive bug alarm 426 is given the same weight. Unfortunately, this view does not accurately reflect real-world development scenarios. Bug fix rates do not necessarily go up as a result of improving the accuracy of bug alerts. A static analysis tool might be highly accurate, but the set of reported bugs might comprise many alerts from, e.g., non-production code, rendering the bug report largely useless to the developer.

This observation illustrates in hindsight a utility of associating a relevance 406 with a bug alert 426. A static analyzer which can compute such relevance scores is a better tool in many scenarios.

In some embodiments, a framework 302 allows a computing system to quantify the relevance of a bug alert to a developer or a team within an organization. This framework may be informed by, and used within, a socio-technical context.

Assume the availability of a static analyzer 308 of acceptable accuracy. Addressing bug alarms 426 may be viewed as a socio-technical activity. Various factors, such as cultural conventions in a team 404, shipment pressures and developer expertise, may influence a developer's motivation to respond to a bug alert prompt 426. A model for this socio-technical activity is a Fogg Behavior Model (FBM). This model suggests that a behavior B (addressing a bug alarm) in response to a prompt P (the bug alarm itself) is a combination of motivating factors M and expertise factors A.

Computing the relevance of bug alarms has several advantages. For example, the bug relevance scores 408 can be leveraged to provide a targeted bug report for the developer. By equating bug relevance to motivation for bug redressal, an organization may benefit from improvements to bug fix rates. The bug relevance scores can also support a long-term trend analysis of adherence to code quality standards 212. For example, if bugs 428 of a certain category are less relevant (lower fix rate) to a team 404 compared to another category, the management can be alerted about this trend, along with quantitative data, allowing corrective action to be taken.

Static analyzers 308 look for bugs in programs without executing them. Since they do not observe the runtime behaviors of a program, static analyzers reason over safe approximations of the actual runtime behaviors. A direct consequence of this is false positives in the set of reported bugs 428; the analysis might flag a code instance 310 as a bug when the instance is actually safe. For example, in the presence of function calls, an analyzer does not have enough information to determine at call return sites the exact set of values which can propagate there, so the analyzer 308 resolves this via over-approximation.

One approach responds to this use of approximations by making such inter-procedural analyses context-sensitive by enriching the data domain with additional information about the call-sites, thus allowing the analyzer 308 to track the propagation of values across function calls more precisely. A philosophy behind such optimizations to improve the precision of static analyzers is similar, namely, a goal is to enrich the data domain to allow better filtering or ranking of results.

However, even when the alarms 426 generated by a static analyzer are accurate, various external factors often influence the likelihood of a developer 104 responding to a bug alarm by changing code 132. Some of these factors are as follows.

First, if a set of bug alarms pertain to code that does not ship, then all those alarms are potentially irrelevant to the developer. Ideally, an analyzer 308 would simply avoid reporting these alarms.

Second, even for code that does ship, a set of bug alarms may pertain to code that is in a servicing mode. Again, these bugs would have little relevance to the developer, and an analyzer 308 may be improved by deprioritizing reporting them.

Third, developers in a team 404 may have greater expertise to address bugs of a particular kind, compared to bugs of a different category. This often translates into higher fix rates for the former category.

Fourth, developers may not have sufficient expertise to address a particular bug alarm 426.

In view of the foregoing, responding to a bug alarm from a static analysis tool may be treated as a sociotechnical problem, that is, a problem with interacting social and technical characteristics. If a static analyzer 308 is agnostic to the overall development context, then the tool 308 is of limited use. Some embodiments address this problem by making the analyzer 308 explicitly aware of data that is more global in scope compared to the code base alone. This permits extrication of additional value from such enhanced static analysis tools.

Some Metrics for Code Health

Let P be a code base (synonymously, a program) 424 and Q be a code-quality standard 212 (Q is also used elsewhere herein to denote conformance with the standard). Let $c_k$ denote a commit made at timestamp k, and $c_{ij}Q$ denote the set of all commits between the timestamps i and j which have at least one usage from Q. Let $n_kQ-$ denote all the detected failures and $n_kQ+$ denote all the detected pass results, with respect to the code quality standard Q, for the commit $c_k$. Let $r_{ij}Q+$ represent a pass density, which is a frequency of correct usages of Q in commits between the timestamps i and j. Then in some embodiments, pass density $r_{ij}Q+$ is defined as a summation from k=i to k=j of $n_kQ+$ divided by ($n_kQ+ + n_kQ-$). A fail density $r_{ij}Q-$ may be similarly defined as a summation from k=i to k=j of $n_kQ-$ divided by ($n_kQ+ + n_kQ-$).

As to notation, i, j, k may be written instead as subscripts, summation may be written instead as a capital Greek letter sigma, identifiers other than Q+ and Q− and r and so on may be used, and other notational or terminological changes may be made, but the metric 312 definitions are not dependent on the use of any particular notation or naming convention. Likewise, these metrics 312 may be given names other than "pass density" and "fail density" without changing their substantive definitions with regard to metric value computations.

Indeed, during the process of arriving at innovations described herein, some nomenclature and terminology used internally by the innovators changed. In particular, some metric names used herein have been overloaded, in the sense that they indicate different metric definitions (e.g., different formulas). For instance, "quality density" has two different definitions herein, so the pertinent definition at a given point in this disclosure is presumed to be the one closest to that point. To resolve any remaining ambiguity, any overloaded metric name or score name or other SDQA value or algorithm or other SDQA item discussed herein is also presumed to mean any or all of the relevant items presented herein, in the absence of a resulting contradiction or other contraindication.

In some embodiments, the $r_{ij}Q+$ and $r_{ij}Q-$ permit a system 202 to quantitatively measure the health of a code base between the timestamps i and j.

In some embodiments, a quality density $G_{ij}Q$ metric 312 is defined as the difference between pass density and fail density for an organization's code base within a range of timestamps: $G_{ij}Q = r_{ij}Q+ - r_{ij}Q-$.

In some embodiments, a quality applicability density $P_{ij}Q$ metric 312 is defined as the ratio of total usage of the code quality standard Q, with respect to the total size of all commits within that timestamp range. Note that $mu(c_{ij}Q)$ denotes the mean size of the commits in $c_{ij}Q$. That is, $mu(c_{ij}Q)$=summation from k=i to k=j of absolute value of $c_k$, the summation then divided by absolute value of $c_{ij}Q$. This leads to a definition of a metric 312 $P_{ij}Q$=summation k=i to k=j of nkQ+ plus nkQ−, the summation then divided by absolute value of cijQ times mu(cijQ).

In some embodiments, the GijQ metric measures a relative expertise 430 of a particular team or developer, with respect to the code quality standard Q. The greater the value of GijQ, the greater the difference between correct and incorrect usages of Q. This metric is useful, for example, for making comparisons across organizations or across teams with respect to developer expertise 430, or with respect to code correctness and overall code quality for a particular standard Q, given a constant threshold of quality applicability density Pij=sigma. In contrast, the PijQ metric measures how relevant a code quality standard Q is, for a particular code base between timestamps i and j. This can be interpreted to mean that the higher the value of PijQ is, the greater is the usage of Q.

The Fogg Behavior Model (FBM) may be applied to formally define a socio-technical development context. Within the FBM, a behavior or action is most likely to occur when three factors converge for a human actor: the actor is sufficiently motivated, the actor has the ability to perform the behavior or action, and the actor is prompted or triggered to perform the behavior or action. Consistent with this model, static analysis tools 308 generate a set of triggers or prompts to users 104, each of which prompt is a proposal to drive an action to fix the software. Depending on the motivation and ability (a measure of implied costs) of the developer, the static analysis result 426 is or is not acted upon.

Differently stated, in an FBM socio-technical development context, a desired behavior is software developer action (as manifest in a system) 714 to reduce or remove violations of a code quality standard Q. The socio-technical development context includes a set of measurable factors in some embodiments.

One factor is developer motivation, as reflected in a metrics 312 data structure representing, e.g., one or more of a servicing or maintenance mode versus an active development mode, a status as production or shipping code versus non-production code, and a time remaining to work-item completion target date (bugs in code which will be shipped soon be have a higher priority than bugs in code that will be shipped later).

Another factor is developer ability, as reflected in a metrics 312 data structure representing, e.g., one or more of a code quality applicability density value, a code quality density value, a developer quality density, and an author distance. As to author distance, in an organizational tree, author distance reflects the length of a path from a developer viewing the bug report to the author of the code. If the distance is zero, it means the developer D is viewing an alert in code that D authored, which increases the relevance of the bug.

Given a development context using FBM, machine learning techniques may be used to build approximations of it. In some embodiments, the model-for-development context is treated as a logistic regression problem wherein $P(y=1)=1/(1+\exp(-\alpha \text{ times } X))$, where $\exp(z)$ represents e to the power z. A dataset D is a collection of m bug alarms 426. For each alarm i in a range $1, \ldots m$ the system 202 measures the value of the j-th feature $x_{ij}$, which is one of the motivation or ability metrics noted above. Categorical attributes are converted to one-hot encodings. The label $y_i$ in $\{0, 1\}$ indicates whether the bug report 426 was acted upon (1) or not (0). The training phase involves learning the weights of the parameters $a_j$. During prediction, the model outputs a score, which is an approximation for the actual bug alarm relevance score.

As an example of a coding quality standard 212, PoliCheck is a static analysis tool 308 which scans a piece of text (code or document) to flag use of inappropriate terms in order to meet the policies outlined in text and code review, for example. The PoliCheck scanning tool statically looks for occurrences of any offensive term included in a PoliCheck Term Database. The database contains the set of potentially offensive terms, a category to which the term belongs (e.g., Diversity, Accessibility, . . . ), and a set of recommended actions under specific contexts. The static analyzer scans the text for potentially offensive terms, and checks if the context causes the term to be inappropriate. An expertise analysis may scan the text for the same terms, and check if the context allows the usage to be appropriate.

As another example of a coding quality standard 212, CredScan is a tool 308 which scans a code base for plaintext credentials. The tool scans the code for matches against specified regular expressions that match plaintext credentials, and filters out spurious reports via static and dynamic validation steps.

Developer-Centered Static Analysis Tools to Measure Expertise

A socio-technical view studies interactions between people and a nonhuman system, in an effort to optimize outcomes. The source code 132 of a software project is a nonhuman aspect of a software development effort. Static analysis 412, the programmatic inspection of a code base 424 to locate quality lapses, is a practice for optimizing source code. The early detection of source code defects 428 lowers costs to fix those defects, compared to finding and fixing problems 428 later in a development lifecycle, e.g., after product release.

Despite this, static analysis 412 is sometimes underutilized by software development teams 404. One reason is a lack of accuracy in static analysis scan results 426, e.g., a high percentage of false positives that incorrectly flag code 310 as problematic. But even when scan analysis results are accurate, a static analysis tool 308 may identify defects that are considered low value, in that the perceived increase in quality from fixing them may not be worth the effort to evaluate and produce fixes for the reported problems.

Triaging a static analysis result 426 involves effort by a developer 104 to understand a presumed issue, verify its accuracy and risk, and determine an appropriate fix. Complicating factors for each of these triage phases center on the developer, the tool, and the code base under scan, respectively.

In an ideal world, the literal cost to implement every fix would be minimal, because the target code base is easily maintained, highly tested, etc. In a given project, in fact, the relevant code base may be extremely large but also be mature and well-tested, and be implemented by industry leading talent.

Still within the ideal world, a static analysis tool would always locate any critical problems, and only critical problems. Reports of coding issues would also clearly describe relevant details of the specific defect, and refer users to equally clear and comprehensive technical documentation for understanding and adhering to the quality standard 212. In practice, a 95% accuracy rate is extremely good for most static analysis scenarios, and has been achieved in some cases. Finally, a developer in an ideal world would always have a good understanding of both the quality standard being enforced and the implementation details relevant to making a fix.

In practice, static analysis 412 may flag issues in areas of a code base 424 that are in a servicing mode, meaning that there is no general development activity for the area. In some cases, this may be due to the area of code's general level of completeness or stability. In other cases, an area is simply not an active focus of the current release cycle. Teams therefore may not have developers 104 available with sufficient expertise in the code to evaluate and fix located bugs at a reasonable cost. Further, there may be a high perceived business risk in allowing inexperienced developers to attempt a fix, e.g., risk of a regression in other product behavior.

In some embodiments, static analysis tools 308 are enhanced to identify good (that is, correctly implemented) patterns 310 as well as defective ones. In some, this enhancement is coupled with an ability to associate automatically detected expertise 430 with specific developers 104 and specific code contributions 310. Put differently, static analysis tooling 308 is reoriented from a tight focus on the nonhuman aspects of software development (detection of source code defects) to also detect the presence or absence of relative expertise 430 in developers to address a class of problems.

An alternative approach to the teachings herein is to make inferences from data that tracks developer fixes of known defects in source code. However, this alternative approach misses cases where developers never make a mistake to begin with. Under this alternative approach, the most expert developers (those who consistently avoid making certain classes of mistake) remain unknown. Accordingly, some embodiments herein utilize SDQA data representing both sets of incoming patterns 310, correctly implemented code patterns and incorrectly implemented code patterns, over time 420, and per developer 104 or developer group 404.

Software developers gain personal satisfaction, which translates into productivity, from meeting programming challenges when those challenges stretch their expertise but still fall within their technical capabilities. If a developer does not possess expertise to meet a challenge, and cannot reasonably gain that expertise, then they are likely to feel overwhelmed or unhappy, unless that expertise gap is closed. In the static analysis 412 domain, a lack of conceptual understanding of a specific quality pattern 212 can be a strong disincentive to act on prompts 426. Clear guidance emitted by the tool 308 and thorough documentation can help. But sometimes better guidance would come from a developer 104 who not only understands the specific quality pattern in play but who knows the design and other details in the code base 424 relevant to a fix.

An expertise-detecting algorithm may help connect developers who have less expertise in a specific quality standard 212 with resources such as correctly implemented code patterns 310 and the expert developers who authored those patterns. Generally, code and colleagues that are as close as possible to the developer who would benefit from assistance will tend to provide the greatest relevance and value to that developer.

In a high-level sense, an expertise-detecting algorithm repurposes static analysis tools 308. Instead of focusing on detection of improperly coded patterns, enhanced tools apply similar techniques to identify code patterns 310 ones that are properly implemented, i.e., meet the standard 212 in question.

In some circumstances, implementation of expertise 430 detection proceeds as follows. One or more analysis tools 308 with corresponding rules that define standards 212 are selected. Selection criteria may favor tooling 308 that satisfies core expectations around quality and accuracy, with standards rules 212 that provide good business impact. Then a complementary expertise-detecting analysis is authored for each rule or conceptual topic implemented in the rules inventory. That is, in addition to rules that detect violation of a standard, the tool 308 rules are enhanced to include rules that detect compliance with the standard.

In some embodiments, additional analysis may be authored to detect an increase in measures of code quality improvements into the analysis streams. Measured events may include, e.g., introductions or updates to a clarifying code comment, or creation of a new unit test. This additional analysis is distinct from other rules, in that an embodiment might not have flag the negative inverse of the standards. For example, it might not be feasible or necessary to measure rules such as "there should be a code comment here" as opposed to rules such as "a more secure parameterization to this API should have been used".

The enhanced analysis 412 is run over a code base 424, to count 214 compliance instances 310 and count 216 noncompliant instances 310. In addition, these example embodiments attribute the instances 310 to developers who contributed them and record this attribution information 118 to a central store. Criteria for attribution may vary, between standards 212 or between embodiments. Attribution may be limited to the developer responsible for initial insertion of the pattern code 310 into the code base 424, or may also include developers who edited the code 310 later. Attribution may occur when code is committed to a repository, or when a file is saved and closed, or at other events.

The enhanced analysis 412 may be repeated over time as a code base is edited, to produce trending data that illuminates how the code base changes over time, or how specific engineers 104 or teams 404 change over time, or both. Defect and expertise detections may be captured in metrics 312, and the results may be used to guide development management or direct actions 714 during development. For example, scheduling developer activity to eliminate previously existing or newly introduced defects may be a direct action 714, as may prioritizing bugs or bug categories for developer attention.

Expertise-Driven Software Properties and Metrics

With enhanced tools 308 available to generate indicators of explicit quality or expertise, one can define several useful metrics, as discussed below and elsewhere herein. For a given code base 424 and for a specific quality standard 212, e.g., a single rule enforced by a static analysis checker 308, let:

E=the number of errors or lapses detected for the quality standard, a.k.a. nonconformance count 216

Q=the number of code patterns that successfully implement or realize the quality standard, a.k.a. conformance count 214

Ce=the number of check-ins that contain one or more explicit lapses against a quality standard Cq=the number of check-ins that successfully implement a quality standard one or more times C=the total number of check-ins for a code base or one or more developers S=the size of the code base or one or more check-ins, by kilo lines of code (KLOC), kilo lines of code exclusive of comments (NKLOC), function points, etc.; a.k.a. code size measure 616

As noted elsewhere herein regarding i, j, k, in a different notation the e and the q in Ce and Cq may be written as subscripts.

From these numbers, a system 202 can compute the following metrics 312:

A quality increase relative to churn (QIRC). Churn is a size measure, e.g., the size of edits contributed in a repository commit or pull request (PR). The code base is churned base by X altered lines or altered characters. An alternate name for QIRC is quality density (QD) or conformance density (CD). QIRC a.k.a. QD a.k.a. CD is defined as Q/S.

A conformance delta 606 (also called at times quality density) is defined as a percentage difference between a pass density rijQ+(percentage of pass results Q in total results Q+E) and a fail density rijQ− (percentage of fail results E in total results Q+E), to measure a gap between pass instances Q and fail instances E A quality increase per check-in (QIPC) is defined as Cq/C.

A success rate (SR) is defined as Q/(Q+E).

A error rate (ER) is defined as E/(Q+E).

A quality applicability density (QAD) also known as a quality standard applicability density (QSAD) or conformance applicability density is defined as (Q+E)/S.

These metrics are further discussed in turn below. Note that in some embodiments each metric can be sliced along dimension boundaries for computation, such as including a whole code base, or being computed per particular developer, per developer group, or per quality standard, for example. For example, a system 202 may compute the success rate for one check or for all checks, for every contribution of a single developer for all security rules, and so on.

Conformance Density
Quality Increase Relative to Churn (QIRC) or Quality Density (QD)

By its definition, the conformance density (QIRC or QD) metric 608, 312 may be seen in hindsight as an analog to a defect density software testing metric E/S. Defect density is defined as the total number of defects in a piece of software divided by the size of that software. Size 616 is typically computed in terms of KLOC (thousands of lines of code) but other size measures 616 may be also or instead be used, such as a count of function points.

Quality density 608 is the total number 214 of correctly implemented patterns 310 for a specific quality standard 212, divided by a size metric 616. The conformance density metric 608 may be computed for a complete code base 424 and all contributing developers 104, may be refactored to correspond to an arbitrary code 424 boundary 622 (such as all code within a specific module, source directory, or namespace) or be factored along a developer 104, 404 boundary. As to developer boundaries, a conformance density metric 608 may be computed based on specific indicators of expertise contributed by one or more developers, divided by the size of all contributions submitted by the same set of developer(s).

As to its uses, in some embodiments conformance density 608 measures and provides a relative ranking 304 for the presence of explicit quality indicators 310 in code. The number of code comments per KLOC is an example of a conformance density measure. This metric 608 allows the opportunity and motivation to implement a specific quality standard 212 to be compared across different code bases 424, teams 404, or developers 104. It also allows distinct quality standards 212 to be ranked in terms of relevance 406 and uptake within the same code base 424 or group of one or more developers.

Quality Increase Per Check-in (QIPC)

By its definition, the Quality Increase Per Check-in metric 312 measures the count 214 of check-ins 642 to a code base 424 that contain one or more explicit indicators 310 of a quality standard 212 divided by the total number of check-ins 642. This metric can be factored along the lines of one or more developers, across a code base, or by specific namespace 658, or by software modules 628, for example.

As to its uses, in some embodiments the QIPC software property provides a measure 736 of consistency in the application of a quality standard 212 normalized along contribution boundaries. If a team or a developer is very consistent in adding at least one unit test, for example, with every code check-in (not accounting for the literal size of the contribution), then the resulting very high QIPC indicates that the quality standard is deeply ingrained in the engineering culture. This measure 312 also helps normalize data for outlier conditions, such as a developer merging an extremely large change in order to move a body of code from one location to another.

Success Rate (SR) and Error Rate (ER)

By their definitions, the Success Rate (SR) 602, 312 and Error Rate (ER) 604, 312 measures reflect the percentage or ration of occurrences 310 a team or developer contributes an error for a specific quality standard 212 relative to the occurrences 310 in which that pattern is implemented correctly.

As to their uses, in some embodiments the degree to which teams or developers tend to correctly or incorrectly satisfy a standard 212 can provide insight as to the relative innate complexity of a technical problem or reflect the existence of an addressable quality issue that may reside in the code itself, in the reporting 426 of a tool, within a team, or in a developer 104. In order to help effectively apply these metrics, some embodiments also provide a measure of relevance 406 of the topic 212 for which the system has produced success vs. error rates.

Quality Applicability Density (QAD) a.k.a. Conformance Applicability Density

By its definition, the QAD metric 614, 312 combines correctly implemented patterns with corresponding defect data. Sorting quality standards such as tool rules by QAD provides a ranking 304 of presumed relevance or applicability of that pattern or standard on a given code base. However, a high QAD may also be driven by a rule 212 that happens to produce large numbers of false positive alerts 426.

As to its uses, in some embodiments the relative applicability 614 or lack of it indicates useful conclusions, particularly when examined in concert with success rates or error rates. As an example, consider a scenario in which running analysis 412 on a large code base 424 produces an order of magnitude greater number of success or error signal points (10K) over the second largest QAD value. Furthermore, suppose the success rate for this defect is 98% (9800 successful implementations vs. 200 vulnerabilities). From this data, one can infer that the team is both motivated to enforce this quality standard (as evident by the many instances in which it is properly implemented) and that developers making fixes will either have the relevant expertise themselves to do so or easily find it elsewhere in the organization. A Fogg Behavior Model prediction for this profile is that if a tool 308 prompts a user to act on the open defects it detects, then the developer will act 714 on the prompts.

As another example, consider a scenario in which a very high QAD measure has the same raw numbers (10 k total patterns) but the success and error rates are reversed (9800 defects vs. 200 correctly implemented patterns). In this situation, one can infer that there is some other factor related to the code that invalidates the applicability of the standards. For example, the code base could be test code which should not be scrutinized at all for a specific pattern, or the team explicitly does not buy into the quality standard (as may be common for style conventions enforced by static analysis checkers), or it may be that the team simply is not cognizant of the associated quality concern. If a tool prompts developers to make a fix for this QAD profile, developers often fail to act on the prompt. An understanding of the metric and of the factors that influence it helps avoid adopting a naïve approach which prompts developers for all bugs at once, sometimes called a "wall of bugs" phenomenon.

As yet another example, a low applicability density measure may be associated with a risk of exaggerated costs to train developers in key concepts required to move on to assessing results. Given a lack of demonstrated expertise with the standard 212, a prompt 426 to a developer is unlikely to lead to a fix because of a lack of expertise on the developer's part and an inability to easily locate a code pattern in the code base or a peer who can assist in producing a fix.

As in the high-QAD case, this low metric 614 score may also indicate a quality problem in the tool 308. For example, the tool may enforce a quality standard 212 that is so rarely relevant that it's not worth the costs to analyze, so that check 212 should be removed.

Accelerating the Development of Expertise in Teams

Some embodiments produce QAD/ER+SR rates for each developer. This sheds light on nearly every class of defect or quality problem, assuming at least one developer in the project has the demonstrated ability to implement a pattern correctly.

Consider a large code base that has 200 total occurrences of a specific class of defect (for a very low code base QAD) of which 20 patterns are defective and 180 are correct. In general, it may be sufficient simply to point developers responsible for fixing the 20 bad patterns to the changes that implement the pattern correctly or to any developer that contributed one of them. By computing the QAD/ER+SR rates for that pattern for each developer who has demonstrated experience with it, however, a system 202 may be able to point 728 a developer to the specific individuals who are best equipped to help them understand and fix the issue.

Identifying and utilizing developer expertise 430 in this way should produce outcomes that are useful to the expert developers. Recognition of expertise is itself inherently valued by most people. Most people and organizations find ways to express their gratitude to others who aid. In general, this approach maximizes the value of specialized knowledge by helping ensure it is available in a maximal number of useful situations.

Such a system 202 may also accelerate the development of expertise where little exists. When few options exist for consultation, those few developers who are candidates will receive concentrated or disproportionate requests for assistance which itself will drive increased understanding on their part of the topic 212 at hand. As an example, consider ten occurrences of a complex persisted cross-site scripting issue in a large code base that is independently tackled by ten developers on ten different teams. Each developer will maximize the time spent to struggle through the problem and the quality of each fix is likely to be limited by the lack of experience. If these ten developers manage to find a single individual in their group that has better relative expertise, each request for assistance will drive additional expertise in the person they are consulting. By the fourth or fifth occurrence, the consulted developer may achieve even greater expertise.

In some embodiments, a per-developer expertise profile includes a measure of relevance for various topics 212 coupled with observations on where the engineer is succeeding or struggling. The expertise profile may be helpful in developer continuing education. For example, a system 202 could identify a set of technical topics relevant to a developer's day-to-day work and rank them according to the QAD metric, thus locating the most applicable technical topics where a developer has been observed to struggle in the code base.

Because developers are people, a system 202 which tracks developer actions, or measure developer expertise based on the result of developer actions, implicates privacy and data control issues for developers. There is no intention herein to violate any security or privacy policy, guideline, or regulation. Techniques such as opt-in, notification, consent, and compliance with applicable laws and regulations should be suitably employed to protect developer and other interests. This disclosure presumes proper developer control for collecting, protecting, and ensuring the accuracy of information that might promote (or degrade) a developer brand.

One approach involves using collected data to build a public developer brand, e.g., on a public repository platform. A badge or other credential may be awarded, based on demonstrated expertise in particular areas 212.

Another example of a standard 212 calls for use of a secure routine, e.g., malloc( ) rather than an insecure routine, e.g., alloca( )

Some embodiments ingest source code data from cloud mining software, e.g., as Microsoft CloudMine™ data or the like. Some ingest cloud mining software data as streams into a database service, e.g., a Microsoft Azure Cosmos DB® database service or the like, and use the ingested data as input for static analyzers 308. Some embodiments leverage a regular expression pattern matcher, such as a Microsoft SarifPatternMatcher™ tool, to check for code quality standards 212. Some augment results with custom post-processing to collate additional data for metrics 312. Some utilize a business intelligence tool, such as Microsoft Power BI® tool, for visualizations of metrics 312. (marks of Microsoft Corporation).

In some embodiments, QAD is influenced by commit size. Different teams 404 could have different practices, so QAD could change significantly from commit to commit due to size changes in the number of lines.

In some embodiments or circumstances, a team 404 includes an organization, e.g., all developers responsible for a particular product line.

In some situations, a development lead would be interested in learning about the trends of code quality in correlation to the code churn. Some embodiments scan the literal lines changed of each commit. In these examples, definitions of metrics are tied to a commit-level, allowing one to study the trend through time without double counting. Getting better quality may be manifest as a rate of change of pass density which is higher than the rate of change of fail density.

Embodiments may be particularly useful to any commercial vendor, by providing quality reports or trending. For example, teachings herein may be applied beneficially by a company that provides advanced static analysis tools, a company whose offerings aggregate quality signals to provide trending data or overall quality assessments, a company that provides integrated debugging environments or extensions that run in IDEs. Source code hosting solution providers may also benefit.

In some embodiments, aspects of teachings herein will be evident in user-facing features of a user interface 124. Some of these aspects may include publishing and aggregating positive evidence of quality. In some cases, teachings will be less visible, or hidden, e.g., when implemented in a back-end to make prioritization recommendations, identify useful code examples, and so on.

Some systems 202 and tools 130 driven by metrics 312 provide insights and useful functionality, such as defect prioritization to identify problems of greatest relevance to a specific project, a relevance classification identifying subsets of code where specific quality patterns are relevant (e.g., in shipping vs. non-shipping code), a maturity classification to identify activities most appropriate to the team or the code base under analysis, and training and coding assistance to identify most useful correctly implemented patterns to assist inexperienced developers in fixing defects assigned to them.

Some embodiments ease developer burdens by improving interaction between a developer and a tool. Some increase the ease, speed, reliability, accuracy, scope, or usability of access to desired information using the tool, such as recommendations 314, or contact info for expert developers.

Some static analysis tools today only produce defect reports. Some systems only track fixes over time to produce trend metrics. These systems entirely miss data points such as call sites which are successfully implemented (sites in which a defect is never introduced). As a result, these systems are unable to analyze and forecast with the precision of embodiments taught herein.

Some static analysis tools are notoriously noisy. Some static analysis results are also applied naively to an entire code base which includes shipping and non-shipping code. By contrast, the counts 214 and 216 in embodiments taught herein allow a system 202 to classify the relevance of quality patterns to subsets of a code base 424.

Moreover, a lack of technical knowledge is a common inhibitor to fixing problems noted in static analysis results. But a system 202 as taught herein identifies code bases and developers having the greatest expertise in specific quality domains 212, which permits the routing of useful and specific examples and contact info to engineers making fixes.

Technical Character

The technical character of embodiments described herein will be apparent to one of ordinary skill in the art, and will also be apparent in several ways to a wide range of attentive readers. Some embodiments address technical activities such as static analysis 412 of thousands of line of computer program source code 132 by executing static analysis tools 308, computing metrics 312, and presenting 728 coding recommendations 314 in a tool 130 user interface 124, which are each an activity deeply rooted in computing technology. Some of the technical mechanisms discussed include, e.g., SDQA software 302, user interfaces 124, software development tools 130, static analysis tools 308, 130, and various data structures implementing, e.g., SDQA scores 218, SDQA metrics 312, and (non)conformance counts (216) 214. Some of the technical effects discussed include, e.g., improving software developer 104 productivity, improving software quality for a broad range of software 424, and various technical benefits called out at different points within the present disclosure. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as such as how to identify low value static analysis tool results 426, how to identify 726 previous solutions of programming problems as relevant recommendations for presentation in a source code editor 502, how to objectively score individual developers 104 or developer groups 404 for their expertise 430 with respect to particular programming challenges 212, and how to meet these and other technical challenges discussed herein without further burdening software developers 104. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other embodiment implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
MAC address: media access control address
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Source code, executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"IoT" or "Internet of Things" means any networked collection of addressable embedded computing or data generation or actuator nodes. An individual node is referred to as an internet of things device or IoT device. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Software development quality assessment operations such as static analysis 412 to obtain 702 counts 214 and 216, and many other operations discussed herein, are understood to be inherently digital. A human mind cannot interface directly with a CPU or other processor, or with RAM or other digital storage, to read and write the necessary data to perform the software development quality assessment operations steps 700 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac gadget" and that claim limitation became subject to means-plus-function interpretation, then at a minimum all structures identified anywhere in the specification in any figure block, paragraph, or example mentioning "zac gadget", or tied together by any reference numeral assigned to a zac gadget, or disclosed as having a functional relationship with the structure or operation of a zac gadget, would be deemed part of the structures identified in the application for zac gadget and would help define the set of equivalents for zac gadget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as alerting, analyzing, assessing, calculating, comparing, computing, counting, directly acting, displaying, evaluating, executing, measuring, obtaining, presenting, quantifying, ranking, recommending, retrieving, sampling, scoring, selecting, utilizing (and alerts, alerted, analyzes, analyzed, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

List of Reference Numerals

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"
104 users, e.g., user of an enhanced system 202, such as a developer or programmer; refers to a human or a human's online identity unless otherwise stated
106 peripheral device
108 network generally, including, e.g., LANs, WANs, software-defined networks, clouds, and other wired or wireless networks 110 processor; includes hardware
112 computer-readable storage medium, e.g., RAM, hard disks
114 removable configured computer-readable storage medium
116 instructions executable with processor; may be on removable storage media or in other memory (volatile or nonvolatile or both) 118 digital data in a system 102
120 kernel(s), e.g., operating system(s), BIOS, UEFI, device drivers
122 applications, e.g., version control systems, cybersecurity tools, software development tools, office productivity tools, social media tools, diagnostics, browsers, games, email and other communication tools, commands, and so on
124 user interface; hardware and software
126 display screens, also referred to as "displays"
128 computing hardware not otherwise associated with a reference number 106, 108, 110, 112, 114
130 tool, especially software development tool, e.g., editor, IDE, profiler, static analyzer, version control tool, repository software, or other tool used to create, document, modify, build, deploy, test, analyze, profile, monitor, or otherwise develop software
132 software source code; digital
134 file, especially file containing source code; digital 136 cloud, cloud computing environment
202 system 102 enhanced with SDQA functionality 210
204 software development, e.g., any activity which uses a software development tool, or creates, documents, modifies, builds, deploys, tests, profiles, monitors, or analyzes software, as represented in a system 102 (purely mental or paper-and-pencil activity is excluded)
206 software development quality, e.g., an aspect or characteristic of any software development activity 204 pertaining to or influencing accuracy, availability, completeness, cost, efficiency, performance, privacy, reliability, security, or usability of software, hardware, or data, as implemented or represented in a system 102
208 software development quality assessment, e.g., an evaluation, measure, score, summary, or test of software development quality 206, as implemented or represented in a system 102
210 software development quality assessment functionality; e.g., software or specialized hardware which performs or is configured to perform at least some version of steps 702 and 708, or any software or hardware which performs or is configured to perform a method 700 or a software development quality assessment activity first disclosed herein
212 software coding quality standard, as implemented in a static analysis tool 308; also referred to by other names herein such as area, challenge, check, domain, pattern, rule, or topic
214 conformance count; digital
216 nonconformance count; digital
218 SDQA score generally; digital; SDQA scores 218 are computed according to SDQA metrics 312

302 SDQA software, e.g., software which upon execution performs at least one set of steps defined above to provide SDQA functionality 210
304 computationally rank an item, by calculating an SDQA score or SDQA metric for the item, or by placing a digital representation of the item in a hierarchy relative to other item representations based on SDQA scores or SDQA metrics
308 static analysis tool; computational; also referred to herein as static analysis engine, static analysis checker, or static analyzer
310 code instance which either conforms or does not conform to a standard 212; includes a portion of source code 132 unless specified otherwise; also referred to herein as code, contribution, indicator, occurrence, or pattern
312 SDQA metric generally, as implemented or represented in a system 202; reference numeral 312 also refers herein to particular named metrics
314 context-specific coding recommendation, e.g., an example of code for use in a particular source code editing context, or contact info for a developer or group 404 who have demonstrated expertise in the current editing context, or in similar editing contexts; digital
316 interface generally; computational
402 code quality score; an example of a score 218; digital
404 group of developers, as represented in a system 202
406 relevance of a quality standard per a metric 312
408 relevance score representing relevance 406; an example of a score 218; digital
410 expertise score representing expertise 430; an example of a score 218; digital
412 static analysis of code as performed computationally; purely mental or pen-and-paper activities are excluded
416 capability of a static analysis tool, e.g., which rules 212 the tool tests code for conformance with,
418 static analysis tool capability 416 score; an example of a score 218; digital
420 time generally, time interval, or point in time; may be represented by a timestamp
422 code instance score for selection 712; digital
424 software generally, also refers to software subjected to static analysis; also referred to herein as code, code base, or program; digital
426 bug alarm produced by tool 308; alarms 426 are also referred to herein as alerts, prompts, reports, or results; digital
428 bug in code; "bug" is used broadly to refer to any identified opportunity for at least one specific optimization, and thus includes but is not limited to code that crashes or produces an inaccurate result; insecure code, for instance, may be accurate and run without crashing but still be a bug for present purposes
430 developer expertise
502 a source code editor; computational
504 compiler; computational
506 software build tool; computational
508 integrated development environment (IDE); computational
602 success rate; digital value or computational activity; an example of an SDQA metric 312
604 error rate; digital value or computational activity; also referred to herein as fail rate; an example of an SDQA metric 312
606 conformance delta; digital value or computational activity; an example of an SDQA metric 312

608 conformance density; digital value or computational activity; an example of an SDQA metric 312
610 nonconformance metric, i.e., any metric which is based on at least a nonconformance count 216; digital value or computational activity; an example of an SDQA metric 312
612 conformance metric, i.e., any metric which is based on at least a conformance count 214; digital value or computational activity; an example of an SDQA metric 312
614 conformance applicability density; digital value or computational activity; an example of an SDQA metric 312
616 code size measure, e.g., KLOC, NKLOC, number of function points, number of characters, number of tokens, Halstead volume, or any size measure that correlates with one of these by virtue of having a Pearson correlation with an absolute value at least 0.8; digital value or computational activity; an example of an SDQA metric 312 aspect
618 quality degradation metric; digital value or computational activity; an example of an SDQA metric 312
620 computational action taken in direct response to a SDQA metric 312 (computation or computed value); an example of a directed action 714
622 code or other item granularity, as represented in a system 202; an example of an SDQA metric 312 aspect
624 software product; digital
626 executable binary file; digital
628 binary component of a product or other program; digital
630 directory in a file system; digital
632 source file; digital
634 code repository; digital and computational
636 developer identity as represented in a system 102
638 time point criterion as represented in a system 102; an example of an SDQA metric 312 aspect
640 change criterion; digital
642 source code change event; digital
644 periodicity criterion; digital
646 time period; digital; daily, hourly, and so on are examples
648 sampling criterion; digital
650 distribution; digital
652 event criterion; digital
654 relationship of points in time to a set of events 656; digital
656 set of events; digital; repository check-in points are examples of events
658 namespace; digital
700 flowchart; 700 also refers to SDQA methods that are illustrated by or consistent with the FIG. 7 flowchart
702 computationally obtain a conformance count and a nonconformance count
704 computationally retrieve from memory 112 a previously stored count
706 execute an automated static analysis; computational
708 computationally utilize both a conformance count and a nonconformance count, or compute an SDQA metric, or do both
710 compute an SDQA metric (mental or pen-and-paper activities are not considered computations or calculations herein, for any metric 312)
712 computationally select a conformant code instance for subsequent presentation as a coding recommendation; conformance may be sufficient, or other selection 712 criteria may also be applied to calculate a code instance score 422, e.g., favor instances from the same code base, favor recent instances, favor instances from developers with a high expertise score
714 direct action in a system 202 based on a metric 312, e.g., computationally flag a static analysis tool for review to see whether the tool is producing low-value alerts, create or update a recommendation 314 data structure for later presentation 728, ranking 304 source codes based on a specified coding quality standard, ranking 304 coding quality standards for relevance, ranking 304 developers as to their expertise in meeting the coding quality standard, ranking 304 static analysis results or static analyzer tools, ranking 304 code instances as to conformance with the coding quality standard, or another computational action disclosed herein as being performed in response to an SDQA metric 312, or combinations thereof
716 computationally measure a success rate 602
718 computationally measure a fail rate 604
720 computationally measure a conformance delta 606
722 computationally measure a conformance density 608
724 computationally measure a conformance applicability density 614
726 computationally select a conformant instance for later use in a recommendation 314
728 computationally present a conformant instance in a recommendation 314, e.g., via a user interface 124
730 computationally display a result 732, e.g., in a user interface 124
732 computational SDQA result, e.g., a score 218, a metric 312, or a ranking 304
734 repeat one or more computational steps disclosed herein, one or more times, sequentially or in parallel or overlapping
736 computationally measure a quality increase per check-in
737 computationally measure a nonconformance metric
738 computationally measure a conformance metric
740 computationally compare respective rates of change of two or more metrics 312
742 rate of change of a metric 312; digital
744 computationally measure a quality degradation metric
746 compute a code quality score 402; compute, calculate, quantify, and evaluate are used interchangeably herein
748 compute a relevance score 408
750 compute an expertise score 410
752 compute a static analysis tool score, e.g., as to relevance or importance to a particular code base
754 any step or item discussed in the present disclosure that has not been assigned some other reference numeral; 754 may thus be shown expressly as a reference numeral for various steps or items or both, and may be added as a reference numeral for various steps or items or both without thereby adding new matter to the present disclosure Conclusion Static analysis 412 of a code base 424 is expanded beyond finding faults 428 to also find code instances 310 where a particular fault could have occurred but did not. A conformance count 214 reflects code portions that satisfy a specified coding rule 212 per static analysis, and a nonconformance count 216 reflects code portions that do not satisfy the coding rule. Various metrics 312 computed from the conformance count and nonconformance count drive software development quality assessments 208. For example, static analysis tools 308 are evaluated based on the metrics, to reduce noise by eliminating low-value bug alerts 426. Particular areas of expertise 430 of developers and developer groups 404 are objectively identified. Source code editors 502 are enhanced to provide specific recommendations 314 in context. Other quality enhancements are also provided.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software development quality assessment method, the method performed by a computing system, the method comprising:
    executing an automated static analysis of a first source code for conformance to a first quality standard, thereby obtaining a conformance count which measures conformance to the first quality standard and obtaining a nonconformance count which measures nonconformance to the first quality standard; and
    utilizing both the conformance count and the nonconformance count to compute and assign at least one of the following digital values: a quality score for the first source code, a relevance score of the first quality standard with respect to the first source code, a first expertise score for a first developer who is associated with the first source code, a first group expertise score for a first group of developers which is associated with the first source code, or a static analysis tool capability score; and
    wherein the method further comprises at least one of:
    (a) repeating the obtaining steps while assessing conformance of the first source code to a second quality standard, and ranking the first quality standard and the second quality standard relative to one another based on a conformance metric of the first quality standard, a nonconformance metric of the first quality standard, a conformance metric of the second quality standard, and a nonconformance metric of the second quality standard; or
    (b) repeating the obtaining steps while assessing conformance of a second source code to the first quality standard, and ranking the first source code and the second source code relative to one another based on a conformance metric of the first source code, a nonconformance metric of the first source code, a conformance metric of the second source code, and a nonconformance metric of the second source code.

2. The method of claim 1, wherein utilizing the conformance count and the nonconformance count comprises measuring at least one of the following:
    a success rate which is defined as the conformance count divided by the sum of the conformance count and the nonconformance count;
    an error rate which is defined as the nonconformance count divided by the sum of the conformance count and the nonconformance count; or
    a conformance delta which is defined as a difference between a nonconformance density and a conformance density.

3. The method of claim 1, wherein utilizing the conformance count and the nonconformance count comprises measuring a conformance density which is defined as the conformance count divided by a size measure of the first source code.

4. The method of claim 1, wherein utilizing the conformance count and the nonconformance count comprises measuring a conformance applicability density which is defined as a sum including the conformance count and the nonconformance count, the sum divided by a size measure of the first source code.

5. The method of claim 4, wherein the conformance applicability density is measured based on at least one of the following granularities of the first source code: a product granularity, an executable binary file granularity, a binary component granularity, a directory granularity, a source file granularity, a repository granularity, or a granularity based on at least one developer identity.

6. The method of claim 1, further comprising repeating the obtaining steps and the utilizing step at multiple points in time, and wherein the multiple points in time are chosen according to at least one of the following criteria:
    a change criterion which specifies a source code change event;
    a periodicity criterion which specifies a time period between successive points of the multiple points in time;
    a sampling criterion which specifies a distribution of the multiple points in time; or
    an event criterion which specifies a relationship of the multiple points in time to a set of events.

7. The method of claim 1, further comprising repeating the obtaining steps at multiple points in time, and wherein the utilizing step includes:
    measuring a conformance metric which is based on at least the conformance count;
    measuring a nonconformance metric which is based on at least the nonconformance count; and
    at least one of: comparing a conformance metric rate of change to a nonconformance metric rate of change, or calculating a quality degradation metric.

8. The method of claim 1, wherein the method utilizes both the conformance count and the nonconformance count to compute and assign the relevance score of the first quality standard with respect to the first source code.

9. The method of claim 1, wherein the method utilizes both the conformance count and the nonconformance count to compute and assign the first group expertise score for the first group of developers which is associated with the first source code.

10. The method of claim 1, wherein the utilizing step includes calculating the first expertise score for the first developer or a first developer group which includes the first developer, and the method further comprises:
- calculating a second expertise score for a second developer or a second developer group which includes the second developer; and
- ranking the first developer or the first developer group or both relative to the second developer or the second developer group or both based on at least the first expertise score and the second expertise score.

11. The method of claim 1, wherein the utilizing step includes evaluating the first static analysis tool as to the capability, and the method further comprises:
- evaluating a second static analysis tool as to the capability; and
- ranking the first static analysis tool and the second static analysis tool relative to one another as to the capability.

12. A software development quality assessment computing system, comprising:
- a digital memory; and
- a processor in operable communication with the digital memory, the processor configured to perform software development quality assessment operations including automatically: obtaining a conformance count which represents a count of conformant code instances in a first source code, the conformance count based on an automated static analysis of the first source code for conformance to a first quality standard; obtaining a nonconformance count which represents a count of nonconformant code instances in the first source code, the nonconformance count based on the automated static analysis of the first source code for conformance to the first quality standard; and utilizing both the conformance count and the nonconformance count to perform at least one of the following: (a) compute a quality score for the first source code, (b) quantify a relevance of the first quality standard with respect to the first source code, (c) calculate a first expertise score for a first developer who is associated with the first source code, (d) evaluate a first static analysis tool as to a capability, or (e) select one of the conformant code instances as a presentable recommendation of a software development tool; and
- wherein the software development quality assessment operations also evaluate a second static analysis tool as to the capability, and rank the first static analysis tool and the second static analysis tool relative to one another as to the capability.

13. The software development computing system of claim 12, further comprising the first static analysis tool, and wherein the conformance count or the nonconformance count or both are based on static analysis of the first source code performed using at least the first static analysis tool.

14. The software development computing system of claim 12, further comprising a software development tool, the software development tool including at least one of: a source code editor, a compiler, an integrated development environment, or a software build tool, and wherein the processor is configured to display in a user interface of the software development tool a result of utilizing the conformance count and the nonconformance count.

15. The software development computing system of claim 12, further comprising a software development tool including a source code editor having a user interface, and wherein the processor is configured to select one of the conformant code instances and to present the selected conformant code instance in the user interface as a recommendation.

16. A computer-readable storage device configured with data and instructions which upon execution by a processor cause a computing system to perform a software development quality assessment method, the method comprising:
- obtaining a conformance count which measures conformance to a first quality standard and obtaining a nonconformance count which measures nonconformance to the first quality standard; and
- utilizing both the conformance count and the nonconformance count to compute and assign at least one of the following digital values: a quality score for a first source code, a relevance score of the first quality standard with respect to the first source code, a first expertise score for a first developer who is associated with the first source code, a first group expertise score for a first group of developers which is associated with the first source code, or a static analysis tool capability score, wherein the utilizing step also includes: measuring a conformance metric which is based on at least the conformance count, measuring a nonconformance metric which is based on at least the nonconformance count, and at least one of: comparing a conformance metric rate of change to a nonconformance metric rate of change, or calculating a quality degradation metric.

17. The computer-readable storage device of claim 16, wherein utilizing the conformance count and the nonconformance count comprises measuring at least one of the following:
- a success rate which is defined as the conformance count divided by the sum of the conformance count and the nonconformance count; or
- an error rate which is defined as the nonconformance count divided by the sum of the conformance count and the nonconformance count.

18. The computer-readable storage device of claim 16, wherein utilizing the conformance count and the nonconformance count comprises measuring a conformance delta which is defined as a difference between a nonconformance density and a conformance density.

19. The computer-readable storage device of claim 16, wherein utilizing the conformance count and the nonconformance count comprises computing and displaying at least one of the following rankings:
- a source code quality ranking of the first source code relative to a second source code, the source code quality ranking based at least on source code quality scores; or
- a relevance ranking of the first quality standard relative to a second quality standard, the relevance ranking based at least on relevance scores.

20. The computer-readable storage device of claim 16, wherein utilizing the conformance count and the nonconformance count comprises computing and displaying an expertise ranking of at least one developer relative to at least one other developer, the expertise ranking based at least on expertise scores.

* * * * *